(No Model.)
C. W. & E. G. GEST.
CIDER MILL.
No. 502,558. Patented Aug. 1, 1893.
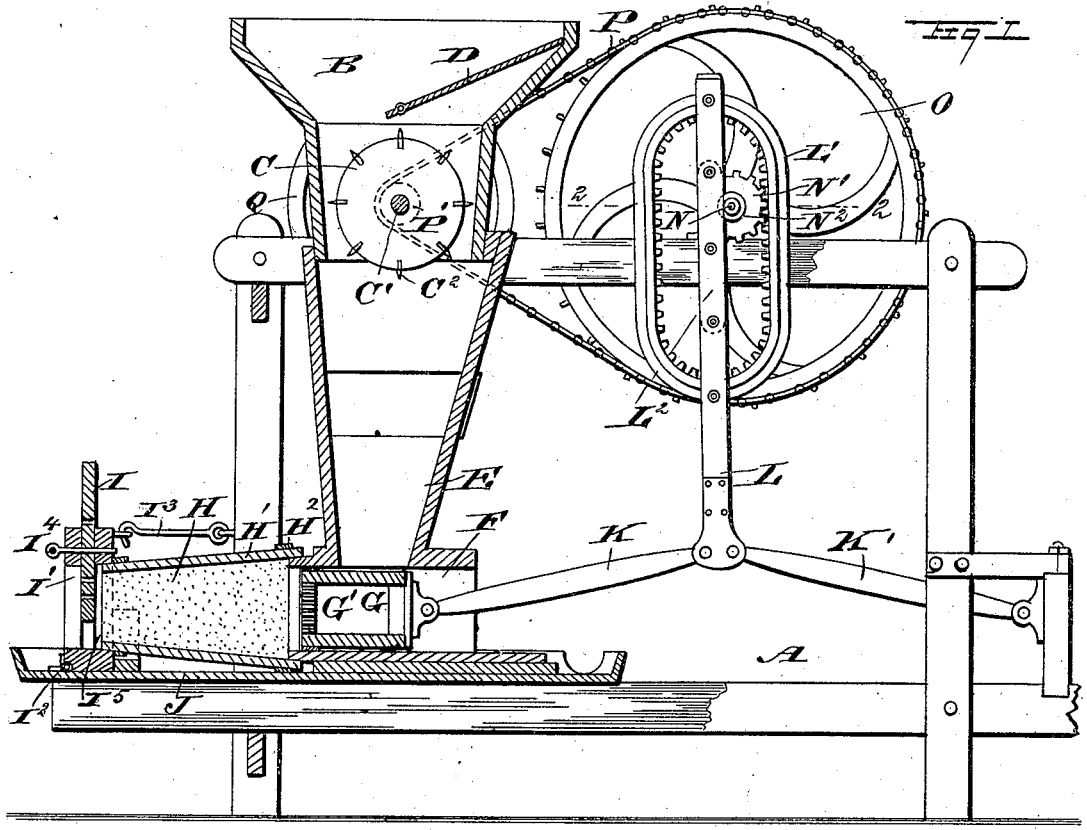
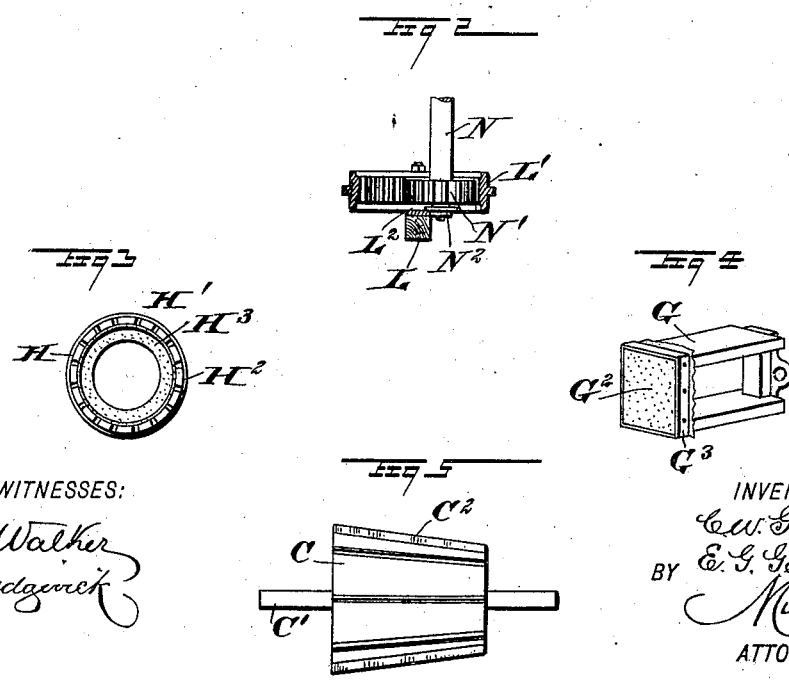
WITNESSES:
H. Walker
C. Sedgwick
INVENTORS
C. W. Gest
E. G. Gest
BY Munn & Co
ATTORNEYS.

UNITED STATES PATENT OFFICE.

CLEMMENT WELLINGTON GEST AND ENOCH GEORGE GEST, OF BRAZIER, OHIO.

CIDER-MILL.

SPECIFICATION forming part of Letters Patent No. 502,558, dated August 1, 1893.

Application filed June 30, 1892. Serial No. 438,491. (No model.)

*To all whom it may concern:*

Be it known that we, CLEMMENT WELLINGTON GEST and ENOCH GEORGE GEST, both of Brazier, in the county of Clermont and State of Ohio, have invented a new and Improved Cider-Mill, of which the following is a full, clear, and exact description.

The object of the invention is to provide a new and improved cider mill, which is simple and durable in construction, very effective in operation, and arranged to grind the fruit to pulp and then press the latter thoroughly to separate the juice from the pomace.

Reference is to be had to the accompanying drawings forming a part of this specification, in which similar letters of reference indicate corresponding parts in all the figures.

Figure 1 is a side elevation of the improvement, with parts in section. Fig. 2 is a sectional plan view of part of the driving mechanism on the line 2—2 in Fig. 1. Fig. 3 is an end view of the press box. Fig. 4 is a perspective view of the plunger; and Fig. 5 is a plan view of the grinding wheel.

The improved cider mill is provided with a suitably constructed frame A which supports on top a hopper B, containing in its bottom a grinding wheel C provided with a shaft C', mounted to turn in suitable bearings in the sides of the hopper B. The grinding wheel C is preferably made in the shape of the frustum of a cone and is provided in its periphery with longitudinal knives $C^2$ adapted to pass close to the sides of the hopper B, so as to grind the fruit very fine.

In the upper part of the hopper B is arranged a chute D pivoted in the middle of the hopper and adapted to be thrown to either side so as to discharge the fruit to either side of the grinding wheel according to the direction in which the latter is turned. The hopper B discharges at its bottom into a chute E opening into a horizontally disposed chamber F, preferably made rectangular in cross section, and containing a hollow or open plunger G formed at one end with a perforated head G' covered by a canvas $G^2$ or other suitable material, so as to form a strainer over the said perforated head. The canvas is held in place by a suitable metallic frame $G^3$ passing over the end of the plunger and secured to the same by screws or other means. The outer end of the chamber F is connected with the press box H made in the shape of a frustum of a cone, the large end of which connects with the chamber F. The press box H is made of staves or slats H' placed short distances apart so as to form longitudinal slots between adjacent staves. The staves are bound in place by hoops $H^2$, and the interior of the press box is preferably lined with canvas $H^3$ or other material.

The small end of the press box H is adapted to be closed by a gate I, mounted to slide vertically in a suitable bearing I' pivoted at the bottom at $I^2$, in the open box or tray J supported on the frame A. The bearing I' is held in place by a hook or hooks $I^3$, connected with the main frame, as is plainly shown in Fig. 1. The gate I can be raised or lowered and fastened in place by means of a pin $I^4$, passing through the bearing I' and through an aperture or a series of apertures arranged in a vertical row in the gate I. Thus, the gate I may be held partly or wholly open, or entirely closed, as desired.

The small end of the press box H fits into a circular recess $I^5$ formed in the inner side of the bearing I', so as to hold the said press box in the proper position so that it coincides with the chamber F. By removing the hook $I^3$, the bearing I' with the gate can be swung outward, so as to free the small end of the press box H, to permit of conveniently removing the latter for cleaning or other purposes.

The end of the plunger G opposite the head G' is pivotally connected by a link K with a vertically arranged bar L, also pivotally connected with a second link K', fulcrumed on the main frame A, the said link K' extending opposite the link K, so that an up and down motion of the bar L causes the reciprocation of the plunger G, and at the same time the link K' forms a resistance for the plunger G.

On the upper end of the bar L is secured an elongated gear wheel L' in mesh with a pinion N' secured on a transversely extending shaft N mounted to turn in suitable bearings in the main frame A. On this shaft N is also secured a friction roller $N^2$, arranged on one face of the pinion N' and adapted to travel on a guideway $L^2$ secured on the inner face of the bar L, so that the elongated gear wheel L' moves properly up and down when the shaft N is rotated.

On the shaft N is secured a large sprocket wheel O, connected by a sprocket chain P with a small sprocket wheel P', secured on the shaft C' of the grinding wheel C. A fly wheel Q is held on the shaft C', and a handle not shown, is preferably secured on the large sprocket wheel O for turning the latter so as to impart a simultaneous reciprocating motion to the plunger G and rotary motion to the grinding wheel C.

The operation is as follows: The fruit to be treated is placed in the hopper B and fed by the chute D to the grinding wheel C, which latter grinds the fruit into very fine pulp, which passes down the chute E into the chamber F at the time the plunger G opens the lower end of the chute E to permit the pulp to pass into the front end of the chamber F. The plunger G, on its forward movement, cuts off the opening of the chute E to the chamber F, and forces the pulp into the press box H, closed at its small end by the gate I. As the pulp accumulates in the press box H it is pressed by the reciprocating plunger at the forward stroke of the latter, so that all the juice contained in the pulp is pressed out, part of the juice passing through the strainer $G^2$ and the perforated head G' into the hollow plunger G, and from the latter through the right hand, open end of the cylinder F into the tray J. Part of the juice is also pressed through the canvas lining $H^3$ of the press box H, and through the slots between the staves, to finally run down into the tray to be discharged from the latter. It is understood that the motion of the reciprocating plunger G is, comparatively, very slow with relation to the revolving of the grinding wheel C, owing to the size of the gearing shown and described. It is further understood that on the revolving of the shaft N the grinding wheel C is rapidly rotated, while the pinion N' imparts a slow up and down motion to the bar L, so that the latter reciprocates the plunger G, the necessary resistance being given to the plunger by the link K'. When the juice has been pressed out of the first part of the pulp introduced into the press box H, then the gate I is lifted so as to permit a partial discharge of the pomace contained in the small end of the press box H. The gate I may also be kept partially open for a discharge of pomace at each forward stroke of the plunger G. As the pulp is gradually pressed toward the smaller end of the press box H, all the juice is pressed out before the pulp reaches the outer end of the said press box.

It will be seen that by using the canvas lining $H^3$ in the press box and the strainer $G^2$ over the plunger, the pulp can be ground very fine, as none of it can escape through the fabric forming the strainer and lining.

Having thus fully described our invention, we claim as new and desire to secure by Letters Patent—

1. In a cider mill, the combination with a hopper containing a grinding wheel and a chute leading from the said hopper, of a subjacent chamber communicating with the said chute, a reciprocating plunger held in the said chamber, a press box made in the shape of the frustum of a cone and connected at its large end with one end of the said chamber so that the reciprocating plunger discharges the crushed apples into the said press box, a gate held on the small end of the said press box, and a bearing carrying the said gate and formed with a circular opening into which projects the small end of the said press box, substantially as shown and described.

2. In a cider mill, the combination with a hopper containing a grinding wheel and a chute leading from the said hopper, of a subjacent chamber communicating with the said chute, a reciprocating plunger held in the said chamber, a press box made in the shape of the frustum of a cone and connected at its large end with one end of the said chamber so that the reciprocating plunger discharges the crushed apples into the said press box, a gate held on the small end of the said press box, a bearing carrying the said gate and formed with a circular opening into which projects the small end of the said press box, and means, substantially as described, for supporting the said gate at any desired height, as set forth.

CLEMMENT WELLINGTON GEST.
ENOCH GEORGE GEST.

Witnesses:
E. B. SCOTT,
WM. R. WALKER.